US008627784B2

(12) United States Patent
Esch et al.

(10) Patent No.: US 8,627,784 B2
(45) Date of Patent: Jan. 14, 2014

(54) SAFETY PRESSURE SENSOR FOR A MILKING PLATFORM

(75) Inventors: Anthony T. Esch, Dodgeville, WI (US);
James D. Siddell, Waunakee, WI (US);
Paul A. Larmour, Jr., Evansville, WI (US);
David A. Reid, Hazel Green, WI (US);
Parimal G. Rajkondawar, Madison, WI (US);
Scott M. Brenner, Fall River, WI (US)

(73) Assignee: Technologies Holdings Corp., Houston, TX (US)

(*) Notice: Subject to any disclaimer, the term of this patent is extended or adjusted under 35 U.S.C. 154(b) by 351 days.

(21) Appl. No.: 13/050,238

(22) Filed: Mar. 17, 2011

(65) Prior Publication Data

US 2011/0308468 A1 Dec. 22, 2011

Related U.S. Application Data

(63) Continuation-in-part of application No. 12/816,451, filed on Jun. 16, 2010, now Pat. No. 8,393,295.

(51) Int. Cl.
*A01K 1/12* (2006.01)

(52) U.S. Cl.
USPC ........................................ 119/14.04

(58) Field of Classification Search
USPC ........ 119/14.01–14.04, 14.18, 516, 520, 521, 119/523–524
See application file for complete search history.

(56) References Cited

U.S. PATENT DOCUMENTS

| | | | | |
|---|---|---|---|---|
| 3,116,713 A * | 1/1964 | Darling | | 119/14.04 |
| 3,499,422 A * | 3/1970 | Nelson | | 119/14.08 |
| 3,765,373 A * | 10/1973 | Phillips | | 119/14.04 |
| 3,835,814 A * | 9/1974 | Jacobs et al. | | 119/14.04 |
| 4,470,108 A * | 9/1984 | Kato et al. | | 700/56 |
| 5,784,993 A * | 7/1998 | Osthues et al. | | 119/14.04 |
| 6,341,582 B1 | 1/2002 | Gompper et al. | | 119/840 |
| 6,571,730 B1 | 6/2003 | Norberg | | 119/14.03 |
| 8,074,600 B2 | 12/2011 | Källén et al. | | 119/14.04 |
| 2002/0033138 A1 | 3/2002 | Brayer | | 119/14.03 |
| 2003/0150389 A1* | 8/2003 | Christensen | | 119/14.02 |
| 2007/0125312 A1* | 6/2007 | Boyd et al. | | 119/721 |

(Continued)

OTHER PUBLICATIONS

USPTO; Office Action for U.S. Appl. No. 12/816,451 in the name of Anthony T. Esch; 9 pages, Aug. 16, 2012.

(Continued)

*Primary Examiner* — Rob Swiatek
*Assistant Examiner* — Ebony Evans
(74) *Attorney, Agent, or Firm* — Baker Botts L.L.P.

(57) ABSTRACT

In certain embodiments, a system includes a milking parlor entrance lane with an entrance positioned adjacent to a cattle holding pen and an exit positioned adjacent to one or more stalls of a rotary milking platform. The system also includes an exit lane positioned on a side of the entrance lane opposite a forward direction of rotation of the rotary milking platform, the milking parlor exit lane positioned adjacent to one or more stalls of a rotary milking platform such that dairy cows may enter the exit lane from the one or more stalls of the rotary milking platform after being milked. The system also includes a pressure sensor positioned adjacent to the exit lane, the pressure sensor operable to generate a trigger in response to detecting a triggering pressure on the pressure sensor. The pressure sensor is additionally operable to communicate the generated trigger to initiate the stopping of the rotary milking platform.

27 Claims, 4 Drawing Sheets

(56) References Cited

U.S. PATENT DOCUMENTS

2009/0145364 A1*   6/2009   Hardy et al. ............... 119/14.04
2010/0095893 A1*   4/2010   Kallen et al. .............. 119/14.04
2010/0307420 A1*  12/2010   Axelsson et al. .......... 119/14.02

OTHER PUBLICATIONS

USPTO; Notice of Allowance and Fee(s) Due for U.S. Appl. No. 12/816,451 in the name of Anthony T. Esch; 6 pages, Jan. 23, 2013.

* cited by examiner

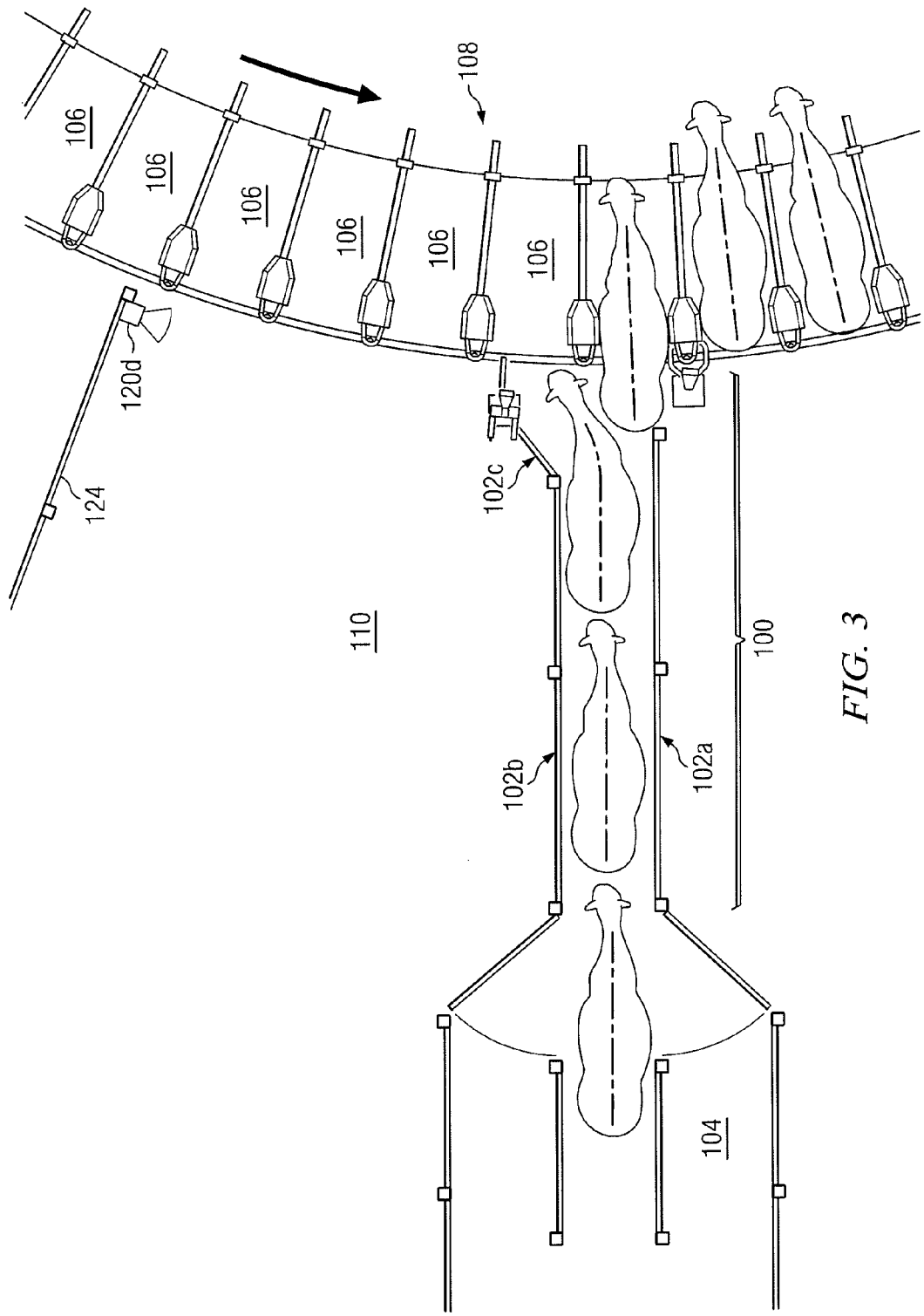

SAFETY PRESSURE SENSOR FOR A MILKING PLATFORM

RELATED APPLICATIONS

This application is a continuation-in-part of U.S. application Ser. No. 12/816,451 filed Jun. 16, 2010, entitled "Ergonomic Entrance Lane for a Milking Platform," currently pending.

TECHNICAL FIELD

This invention relates generally to dairy farming and more particularly to a safety pressure sensor for a milking platform.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, a system includes a milking parlor entrance lane with an entrance positioned adjacent to a cattle holding pen and an exit positioned adjacent to one or more stalls of a rotary milking platform. The system also includes an exit lane positioned on a side of the entrance lane opposite a forward direction of rotation of the rotary milking platform, the milking parlor exit lane positioned adjacent to one or more stalls of a rotary milking platform such that dairy cows may enter the exit lane from the one or more stalls of the rotary milking platform after being milked. The system also includes a pressure sensor positioned adjacent to the exit lane, the pressure sensor operable to generate a trigger in response to detecting a triggering pressure on the pressure sensor. For example, the pressure sensor may be positioned on the floor adjacent to the exit lane. The pressure sensor is additionally operable to communicate the generated trigger to initiate the stopping of the rotary milking platform.

Particular embodiments of the present disclosure may provide one or more technical advantages. For example, a pressure sensor may be located near the pinch point between a wall of an exit lane and the rotary milking platform. Because the pressure sensor may be operable to generate a trigger that initiates the stopping of the rotation of the rotary milking platform in response to detecting a triggering pressure (such as may be caused by a dairy worker stepping on the pressure sensor), the pressure sensor may decrease the risk of injury for dairy workers (e.g., by initiating stopping of the rotary milking platform if a dairy worker gets close to the pinch point between the wall of exit lane and the rotary milking platform). Furthermore, the signal generated by the pressure sensor may additionally initiate the application of a reverse rotational force to the rotary milking platform. This reverse rotational force may cause the rotary milking platform to move in the reverse direction a distance less than the width of a stall, thereby further increasing safety by allowing a dairy worker who may have become entangled in the pinch point between the wall of exit lane and the rotary milking platform to be released.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example use scenario for entrance lane depicted in FIG. 1, according to certain embodiments of the present disclosure.

DETAILED DESCRIPTION OF THE DRAWINGS

Figure 1A:
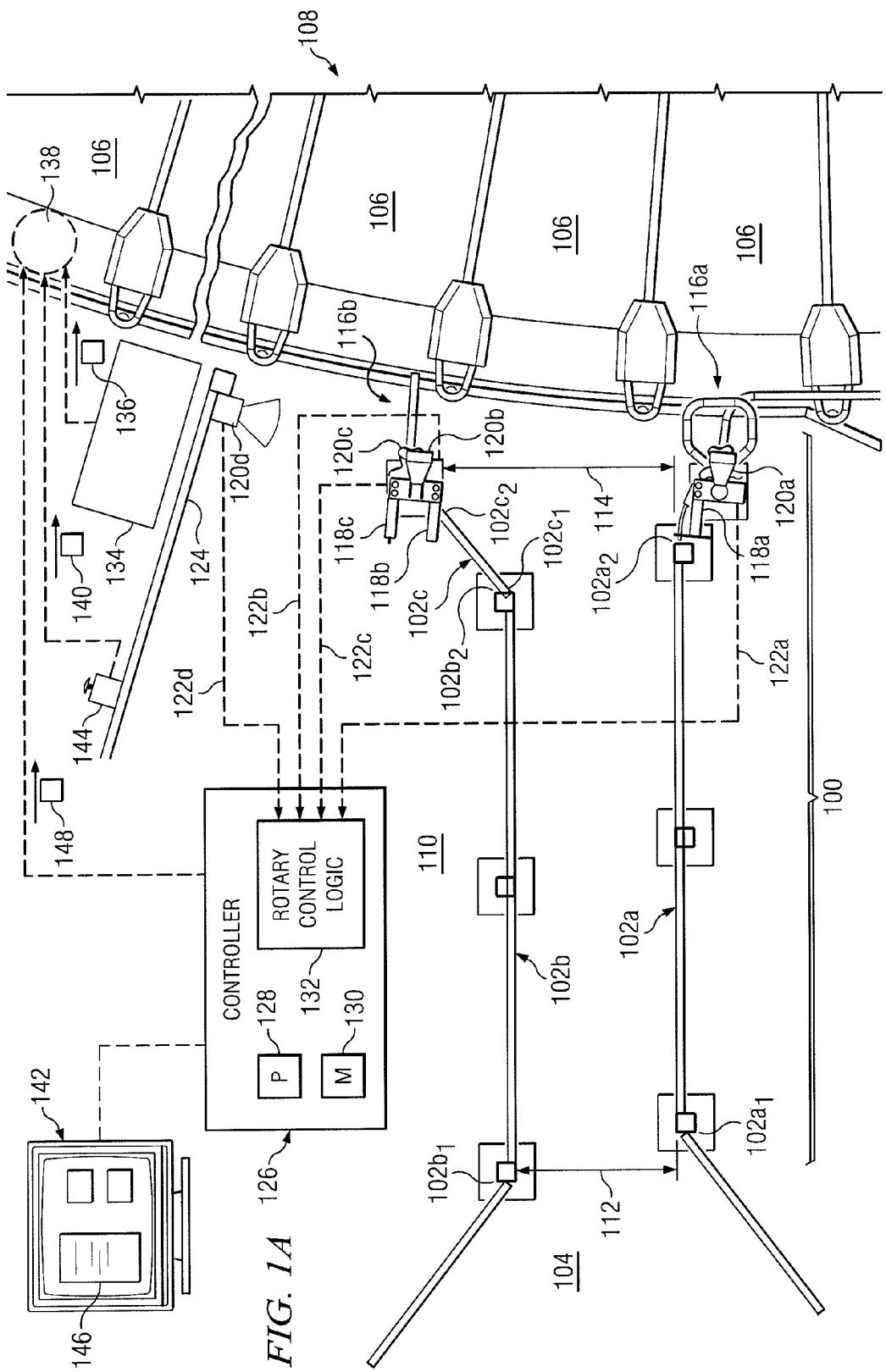
FIGS. 1A-1B illustrate top and perspective views of an example entrance lane for a milking platform, according to certain embodiments of the present disclosure.
Figure 1B:
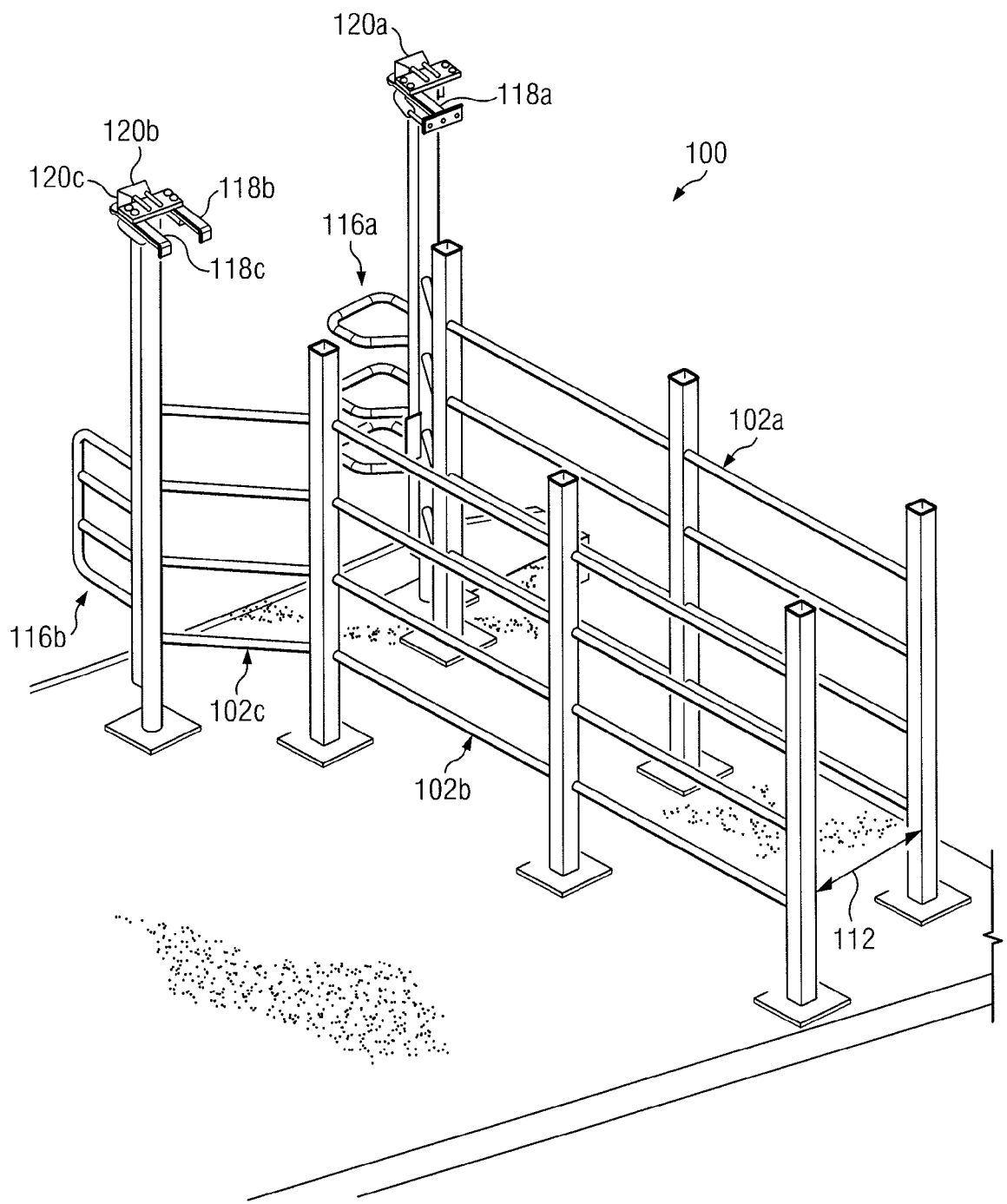

FIGS. 1A-1B illustrate top and perspective views of an example entrance lane 100 for a milking platform 108, according to certain embodiments of the present disclosure. Entrance lane 100 includes a number of walls 102 forming a pathway for dairy cows to move from a holding pen 104 to one or more stalls 106 of a milking platform 108. In general, a group of dairy cows are held in a holding pen 104 prior to being milked in the one or more stalls 106 of milking platform 108. By decreasing the effective area of holding pen 104 (e.g., using a crowd gate), the dairy cows are encouraged to pass one at a time though entrance lane 100 and into stalls 106 of milking platform 108.

In certain embodiments (e.g., as illustrated in FIGS. 1A-1B), milking platform 108 may comprise a rotary milking platform having a counterclockwise forward direction of rotation. In such embodiments, dairy cows in stalls 106 are milked as the stalls 106 rotate on a rotating platform, with the dairy cows being discharged into an exit lane 110 after the rotary platform completes a single rotation. Although the present disclosure contemplates milking platform 108 as being any suitable type of milking platform, it is assumed throughout the remainder of this description that milking platform 108 is a rotary milking platform (for purposes of simplicity).

Walls 102 of entrance lane 100 may each be constructed of any suitable materials arranged in any suitable configuration operable to encourage the orderly movement of dairy cows. For example, walls 102 may each include any number and combination of posts, rails, tubing, rods, connectors, cables, wires, and/or beams operable to form a substantially planar barricade such as a fence, wall, and/or other appropriate structure suitable to encourage the orderly movement of dairy cows. In certain embodiments, walls 102 may be constructed by extending a number of rails between adjacent posts such that the rails are flush with the posts along the interior portion of entrance lane 100. As a result, the posts forming walls 102 may not protrude into entrance lane 100 (as in certain conventional entrance lane configurations), thereby decreasing the likelihood of injury to or irritation of the dairy cows as they pass through entrance lane 100.

Walls 102 of entrance lane 100 may be oriented such that a first end $102a_1$ of a first wall 102a and a first end $102b_1$ of a second wall 102b form an entrance 112 to entrance lane 100 having a width corresponding to the width of a single dairy cow (e.g., thirty inches to thirty-six inches). In certain embodiments, a width corresponding to the width of a single dairy cow may be a minimum width allowing a single dairy cow to comfortably walk. First wall 102a and second wall 102b may be oriented substantially parallel to one another such that the portion of entrance lane 100 defined by first wall 102a and second wall 102b has a substantially uniform width. Additionally, a first end $102c_1$ of a flare wall 102c may be coupled to a second end $102b_2$ of second wall 102b. Moreover, flare wall 102c extends outwardly at an angle in the range of thirty-five degrees to forty-five degrees with respect to second wall 102b such that a second end $102c_2$ of flare wall 102c and a second end $102a_2$ of first wall 102a define an exit 114 to entrance lane 100 having a width corresponding to one and a half times the width of entrance 112 to entrance lane 100 (e.g., forty to fifty-four inches).

The above-described configuration of walls 102 may encourage dairy cows to enter entrance lane 100 one at a time, thereby reducing the likelihood of congestion within entrance lane 100. Additionally, the extra width at exit 114 from entrance lane 100 may afford the dairy cows additional room to line up with one or more stalls 106 of rotary milking platform 108, which may increase the speed and ease with which the dairy cows load into stalls 106. By reducing congestion and increasing speed and ease of loading, entrance lane 100 may increase the efficiency of the milking process, resulting in greater overall milk production.

Entrance lane 100 may additionally include a number of gates 116. Gates 116 may each be constructed of any suitable materials arranged in any suitable configuration operable to perform the functionality described below. For example, gates may each include any number and combination of rails, tubing, rods, connectors, cables, wires, and/or beams operable to perform the functionality described below. In certain embodiments (e.g., as illustrated in FIGS. 1A and 1B), entrance lane 100 may include a first gate 116a formed from a three-dimensional (e.g., D-shaped) arrangement of tubing material and a second gate 116b formed from a substantially planar arrangement of tubing material. First gate 116a may be coupled to the second end $102a_2$ of first wall 102a and second gate 116b may be coupled to second end $102c_2$ of flare wall 102c. Gates 116 may each be coupled to the corresponding walls 102 using any suitable hardware components such that the gates 116 may pivot about the point of attachment to walls 102.

In certain embodiments, a first actuator 118a may be coupled to first gate 116a, a second actuator 118b may be coupled to second gate 116b, and a third actuator 118c may be coupled to second gate 116b. Actuators 118 may each comprise any suitable configurations of springs and/or other materials permitting actuators 118 to impede rotational deflections of the gates 116 to which they are coupled. For example, actuators 118 may be configured to maintain gates 116 in a default orientation (i.e., an orientation in the absence of any external force being applied to gates 116, such as by a dairy cow). The default orientation of gates 116 may be an orientation in which gates 116 are oriented substantially parallel to a stall 106 located adjacent to exit 114 of entrance lane 100. Furthermore, each actuator 118 may be independently adjustable such that the force needed to overcome the impedance provided by each actuator 118 (i.e., the force required to move gates 116 from a default orientation) may be independently adjusted.

In certain embodiments, a first sensor 120a may be positioned proximate to first actuator 118a (e.g., by coupling sensor 120a to second end $102a_2$ of first wall 102a adjacent to actuator 118a), a second sensor 120b may be positioned proximate to second actuator 118b (e.g., by coupling sensor 120b to second end $102c_2$ of flare wall 102c adjacent to actuator 118b), and a third sensor 120c may be positioned proximate to third actuator 118c (e.g., by coupling sensor 120c to second end $102c_2$ of flare wall 102c adjacent to actuator 118c). Each sensor 120 may comprise any suitable device operable to generate a trigger 122 in response to a threshold amount of deflection of a gate 116 (the threshold amount of deflection of the gate 116 causing deflection of the actuator 118 coupled to the gate 116, which may in turn be detected by the sensor 120 positioned proximate to the actuator 118). A trigger 122 generated by a sensor 120 may be an electrical signal generated by the sensor 120, the interruption of an electrical signal passing through sensors 120, or any other suitable trigger, according to particular needs.

The threshold amount of deflection gates 116 causing sensors 120 to generate triggers 122 may be independently adjusted (e.g., by adjusting the point at which each sensor 120 is coupled to a wall 102 relative to an actuator 118). As a result, sensor 120a may generate a trigger 122a in response to an amount of rotational deflection of gate 116a different than the amount of rotational deflection of gate 116b in the same direction that would cause the generation of a trigger 122b by sensor 120b. Additionally, sensor 120b may generate a trigger 122b in response to an amount of rotational deflection of gate 116b different than the amount of rotational deflection of gate 116b (in the opposite direction) that would cause the generation of a trigger 122c by sensor 120c.

In certain embodiments, a fourth sensor 120d may be coupled to a wall 124 of exit lane 110. Fourth sensor 120d may be coupled to an end of wall 124 nearest rotary milking platform 108. Sensor 120d may include any suitable sensor operable to generate a trigger 122 (i.e., an electrical signal generated by sensor 120d, the interruption of an electrical signal passing through sensor 120d, or any other suitable trigger 122d, according to particular needs) in response to detecting the presence of a dairy cow within a predefined proximity of sensor 120d. For example, sensor 120d may be operable to generate a trigger 122d in response to detecting the presence of a dairy cow within six inches of sensor 120d (and, as a result, wall 124 of exit lane 110).

In certain embodiments, sensors 120 may each be communicatively coupled (e.g., via a network facilitating wireless or wireline communication) to a controller 126 such that triggers 122 generated by sensors 120 may be communicated to controller 126. Controller 126 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, controller 126 may include any suitable combination of software, firmware, and hardware. Controller 126 may additionally include one or more processing modules 128 and one or more memory modules 130. Processing modules 128 may each include one or more microprocessors, controllers, or any other suitable computing devices or resources and may work, either alone or with other components described herein, to provide a portion or all of the functionality described herein. Memory modules 130 may take the form of volatile or non-volatile memory including, without limitation, magnetic media, optical media, random access memory (RAM), read-only memory (ROM), removable media, or any other suitable memory component.

In certain embodiments, controller 126 may include rotary control logic 132. Rotary control logic 132 may include any information, logic, and/or instructions stored and/or executed by controller 126 to control the operation of (e.g., the starting and stopping of) rotary milking platform 108 in response to triggers 122 received from one or more sensors 120. For example, rotary control logic 132 may initiate stopping the rotation of rotary milking platform 108 (e.g., by communicating a signal to a rotary milking platform drive mechanism 138, such as a hydraulic motor, which may stop the supply of forward rotational force to rotary milking platform 108) in response to receipt of a trigger 122a from sensor 120a, trigger 122a having been generated by sensor 120a in response to a threshold amount of rotational deflection of first gate 116a in a direction corresponding to the forward direction of rotation of rotary milking platform 108 (such as would be caused by a dairy cow contacting first gate 116a after having failed to timely enter a stall 106 of rotary milking platform 108).

Rotary control logic 132 may additionally initiate stopping the rotation of rotary milking platform 108 (e.g., by communicating a signal to a rotary milking platform drive mechanism 138, such as a hydraulic motor, which may stop the supply of forward rotational force to rotary milking platform 108) in response to receipt of a trigger 122b from sensor 120b, trigger 122b having been generated by sensor 120b in response to a threshold amount of rotational deflection of second gate 116b in a direction corresponding to the forward direction of rotation of rotary milking platform 108 (such as would be caused by a dairy cow contacting second gate 116b after having failed to timely exit a stall 106 and enter exit lane 110).

Rotary control logic 132 may additionally initiate stopping the rotation of rotary milking platform 108 (e.g., by communicating a signal to a rotary milking platform drive mechanism 138, such as a hydraulic motor, which may stop the supply of forward rotational force to rotary milking platform 108) in response to receipt of a trigger 122c from sensor 120c, trigger 122c having been generated by sensor 120c in response to a threshold amount of rotational deflection of second gate 116b in a direction corresponding to a reverse direction of rotation of rotary milking platform 108 (such as would be caused if an operator reversed the direction of rotation of rotary milking platform 108 causing a dairy cow that has failed to fully enter a stall 106 of rotary milking platform 108 to contact second gate 116b).

Rotary control logic 132 may additionally initiate stopping the rotation of rotary milking platform 108 (e.g., by communicating a signal to a rotary milking platform drive mechanism 138, such as a hydraulic motor, which may stop the supply of forward rotational force to rotary milking platform 108) in response to receipt of a trigger 122d from sensor 120d, trigger 122d having been generated by sensor 120d in response to detecting the presence of a dairy cow within a predefined proximity of sensor 120d (such as would be caused if an operator reversed the direction of rotation of rotary milking platform 108 causing a dairy cow that has failed to fully exit a stall 106 of rotary milking platform 108 to contact wall 124 of exit lane 110).

By generating triggers 122 that cause rotary control logic 132 to initiate stopping of the rotation of rotary milking platform 108 (as described above), sensors 120 may decrease the risk of injury for dairy cows failing to timely enter and exit stalls 106 of the rotary milking platform 108. Furthermore, because both actuators 118 and sensors 120 may be independently adjusted (as described above), entrance lane 100 may be configured such that unnecessary stopping of the rotary milking platform 108 is minimized, thereby improving throughput, decreasing mechanical wear, and improving cow identification performance.

In certain embodiments, a pressure sensor 134 may be positioned adjacent to exit lane 110. For example, the pressure sensor may be positioned on the floor adjacent to the exit lane. Pressure sensor 134 may comprise any suitable device operable to generate a trigger 136 in response to a threshold amount of pressure upon pressure sensor 134. A trigger 136 may be an electrical signal generated by the pressure sensor 134, the interruption of electrical signal passing through pressure sensor 134, or any other suitable trigger, according to particular needs. In certain embodiments the threshold amount of pressure causing pressure sensor 134 to generate trigger 136 may be a fixed amount (e.g., an amount corresponding to the weight of a human being). In certain embodiments, the threshold amount of pressure causing pressure sensor 134 to generate trigger 136 may be adjustable, and pressure sensor 134 may be adjusted such that it may generate trigger 136 in response to an amount of pressure corresponding to the weight of a human being. An example of pressure sensor 134 is an OMRON Safety Mat.

In certain embodiments, pressure sensor 134 may be operable to communicate a generated trigger 136 to initiate the stopping of the rotation of rotary milking platform 108. For example, pressure sensor 134 may communicate a generated trigger 136 to rotary milking platform drive mechanism 138. In certain embodiments, pressure sensor 134 may be hard-wired to rotary milking platform drive mechanism 138 such that a generated trigger 136 may be communicated to rotary milking platform drive mechanism 138. In response to receipt of the generated trigger 136 from pressure sensor 134, a circuit in rotary milking platform drive mechanism 138 may be tripped, thereby initiating the stopping of rotary milking platform 108 by ceasing the supply of forward rotational force to rotary milking platform 108. By generating trigger 136 that initiates the stopping of the rotation of rotary milking platform 108, pressure sensor 134 may decrease the risk of injury for dairy workers that are within the vicinity of stalls 106 of the rotary milking platform 108.

Although pressure sensor 134 is depicted and primarily described as directly coupled to rotary milking platform drive mechanism 138, the present disclosure contemplates that pressure sensor 134 may be configured to communicate with rotary milking platform drive mechanism 138 in any other suitable manner. As one additional example, pressure sensor 134 may be communicatively coupled to controller 126, which may relay a generated trigger 148 to rotary milking platform drive mechanism 138.

In certain embodiments, a local reset switch 144 may be positioned near pressure sensor 134 (e.g., on wall 124 of exit lane 110). Local reset switch 144 may include any suitable device operable to generate a reset signal 140. Reset signal 140 may be an electrical signal generated by local reset switch 144, the resumption of an electrical signal passing through local reset switch 144, or any other suitable signal to be communicated to rotary milking platform drive mechanism 138 in order to cause rotary milking platform drive mechanism 138 to resume providing the supply of forward rotational force to rotary milking platform 108 (as described below). For example, local reset switch 144 may comprise a device operable to generate a reset signal 140 in response to a user input (e.g., a user pressing a button). In certain embodiments, however, local reset switch 144 may be prevented from generating a reset signal 140 (which may cause rotary milking platform drive mechanism 138 to resume providing the supply of forward rotational force to rotary milking platform 108, as described below) until a triggering pressure is no longer detected by pressure sensor 134 (as such a pressure may indicate that a dairy worker remains within the vicinity of stalls 106 of the rotary milking platform 108).

In certain embodiments, local reset switch 144 may be communicatively-coupled (e.g., hard-wired) to rotary milking platform drive mechanism 138 such that a generated reset signal 140 may be communicated to rotary milking platform drive mechanism 138. In response to receiving a reset signal 140 from local reset switch 144, rotary milking platform drive mechanism 138 may resume providing the supply of forward rotational force to rotary milking platform 108 (e.g., the reset signal 140 may cause the resetting of a circuit tripped in rotary milking platform drive mechanism 138, as described above).

Although local reset switch 144 is depicted and primarily described as a device hard-wired to rotary milking platform drive mechanism 138 such that a reset signal 140 may be communicated to rotary milking platform drive mechanism 138, the present disclosure contemplates that local reset switch 144 may alternatively be integrated with controller 126 and that controller 126 may generate the reset signal 140 (e.g., in response to a user interaction with a graphical user interface of a display) to be communicated to rotary milking platform drive mechanism 138.

Additionally or alternatively, a master reset may be integrated with controller 126. In certain embodiments, a user may interact with a graphical user interface of a display (e.g., display 142, discussed below) associated with controller 126 to generate a master reset signal 148, and controller 126 may communicate the generated master reset signal 148 to rotary milking platform drive mechanism 138. In certain embodiments, however, the master reset may be prevented from generating a master reset signal 148 (which may cause rotary milking platform drive mechanism 138 to resume providing the supply of forward rotational force to rotary milking platform 108, as described below) until a triggering pressure is no longer detected by pressure sensor 134 (as such a pressure may indicate that a dairy worker remains within the vicinity of stalls 106 of the rotary milking platform 108).

In certain embodiments, controller 126 may be communicatively-coupled to rotary milking platform drive mechanism 138 such that a generated master reset signal 148 may be communicated to rotary milking platform drive mechanism 138. In response to receiving the master reset signal 148 from controller 126, rotary milking platform drive mechanism 138 may resume providing the supply of forward rotational force to rotary milking platform 108 (e.g., the master reset signal 148 may cause the resetting of a circuit tripped in rotary milking platform drive mechanism 138, as described above). In embodiments in which a local reset switch 144 is also positioned near pressure sensor 134 (e.g., on wall 124 of exit lane 110), rotary milking platform drive mechanism 138 may be prevented from resuming providing the supply of forward rotational force to rotary milking platform 108 until both the master reset signal 148 is received from controller 126 and the local reset signal 140 is received from local reset switch 144.

In certain embodiments, a display 142 may be provided. Display 142 may be an LCD, CRT, OLED, or any other suitable display device. Display 142 may have touch-screen capabilities to receive input from a user. In certain embodiments, display 142 may display notifications 146 to a user. The notifications 146 may include a variety of information related to the operation of the rotary milking platform 108. For example, a notification 146 may include information concerning a trigger 136 generated by the pressure sensor 134. Additionally, display 142 may display information concerning triggers 122a, 122b, 122c, 122d, or any other generated trigger, along with directions for corrective actions to clear triggers 122a, 122b, 122c, 122d, or any other generated trigger.

In certain embodiments, rotary milking platform drive mechanism 138, having stopped the supply of forward rotational force (as described above), may be additionally operable to supply a reverse rotational force to the rotary milking platform 108. Rotary milking platform drive mechanism 138 may, for example, supply this reverse rotational force to rotary milking platform 108 in order to move rotary milking platform 108 a distance less than the width of a stall 106. In certain embodiment, the distance moved by rotary milking platform 108 may be determined by a rotary encoder or any other position sensor. Because a generated trigger 136 may signify that a worker has stepped on the pressure sensor and is too close to the pinch point of exit lane 110, the supply of reverse rotational force to rotary milking platform 108 may cause the rotary milking platform 108 to move in the reverse direction a distance that allows the worker to be released from the pinch point of exit lane 110.

Although a particular implementation of entrance lane 100 is illustrated and primarily described, the present disclosure contemplates any suitable implementation of entrance lane 100, according to particular needs. Moreover, although entrance lane 100 is primarily described as forming a pathway for dairy cows to move from a holding pen 104 to one or more stalls 106 of a milking platform 108, the present disclosure contemplates entrance lane 100 forming a pathway for any suitable dairy livestock (e.g., cows, water buffalo, goats, etc.) to move from a holding pen 104 to any other location, such as to one or more stalls 106 of a milking platform 108. Moreover, in such alternative embodiments, entrance lane 100 may include dimensional changes corresponding to the size of the particular dairy livestock.

Figure 2:
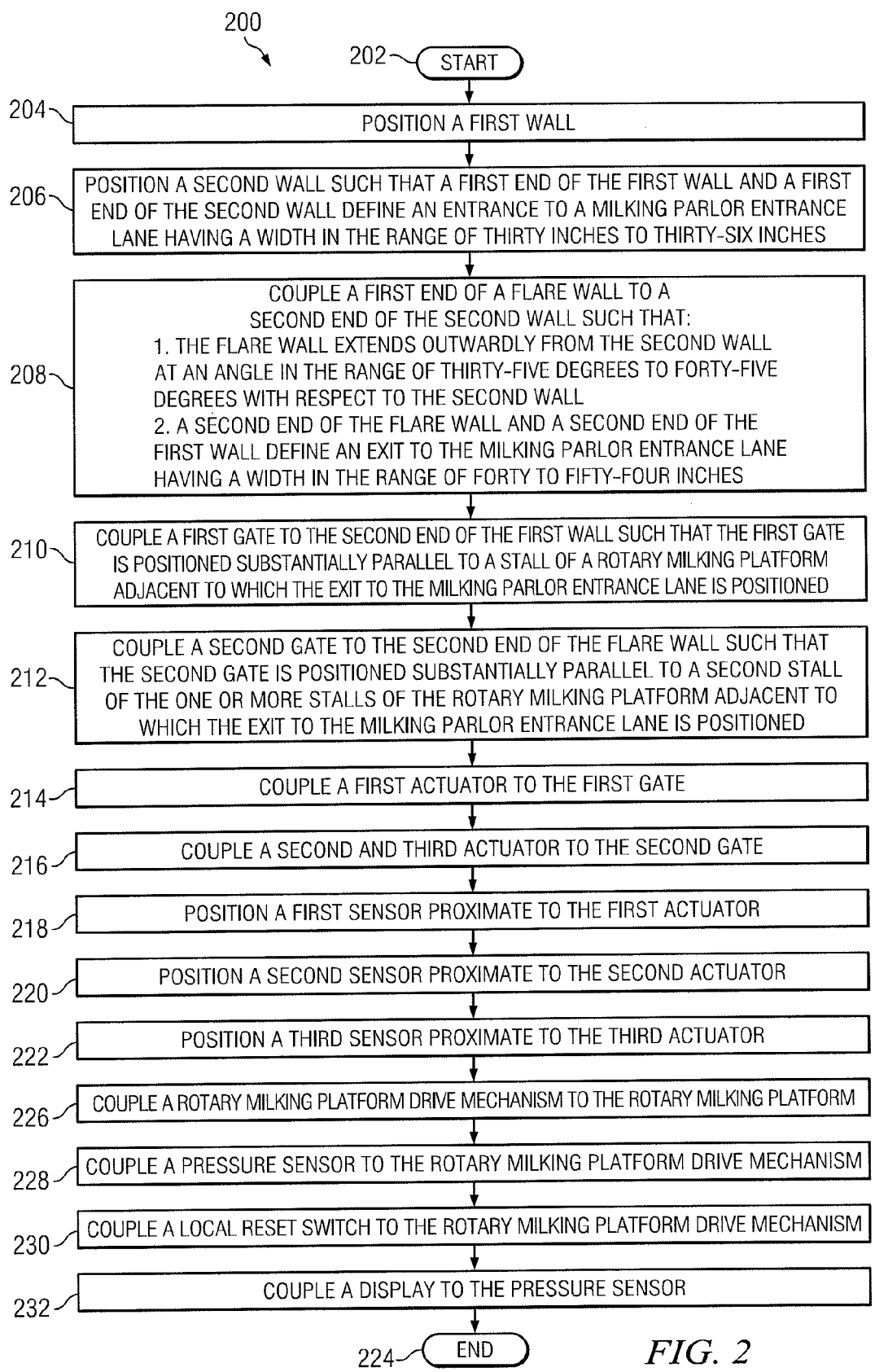
FIG. 2 illustrates an example method of installation of the entrance lane depicted in FIG. 1, according to certain embodiments of the present disclosure.

FIG. 2 illustrates an example method 200 for installation of entrance lane 100, according to certain embodiments of the present disclosure. The method begins at step 202. At step 204, first wall 102a is positioned. At step 206, second wall 102b is positioned such that first end $102a_1$ of first wall 102a and first end $102b_1$ of second wall 102b define an entrance 112 to entrance lane 100 having a width corresponding to the width of a single dairy cow (e.g., in the range of thirty inches to thirty-six inches). In certain embodiments, a width corresponding to the width of a single dairy cow may be a minimum width allowing a single dairy cow to comfortably walk.

At step 208, flare wall 102c is positioned with first end $102c_1$ coupled to second end $102b_2$ of second wall 102b. Flare wall 102c is positioned to extend outwardly from second wall 102b at an angle in the range of thirty-five degrees to forty-five degrees with respect to the second wall such that second end $102c_2$ of flare wall 102c and second end $102a_2$ of first wall 102a define an exit 114 to entrance lane 100 having a width corresponding to one and a half times the width of entrance 112 of entrance lane 100 (e.g., in the range of forty to fifty-four inches).

In certain embodiments, walls 102 may each be positioned by setting one or more posts in the ground (e.g., such that the posts are substantially vertical) and extending one or more rails between adjacent posts. The rails may extend between adjacent posts such that the rails are flush with the posts along the interior portion of entrance lane 100. As a result, the posts forming walls 102 may not protrude into entrance lane 100 (as in certain conventional entrance lane configurations), thereby decreasing the likelihood of injury to or irritation of the dairy cows as they pass through entrance lane 100.

At step 210, first gate 116a is coupled to second end $102a_2$ of first wall 102a such that first gate 116a is positioned substantially parallel to a stall 106 of rotary milking platform 108 (a stall 106 adjacent to exit 114 of entrance lane 100). At step 212, second gate 116b is coupled to second end $102c_2$ of flare wall 102c such that second gate 116b is positioned substantially parallel to a stall 106 of rotary milking platform 108 (a stall 106 adjacent to exit 114 of entrance lane 100). Gates 116 may be coupled to walls 102 using any suitable hardware operable to permit gates 116 to rotate about the point of attachment to walls 102.

At step 214, first actuator 118a is coupled to first gate 116a. At step 216, second actuator 118b and third actuator 118c are each coupled to second gate 116b. Actuators 118 may each be configured to maintain the above-discussed orientation of gates 116 with respect to stalls 106 of rotary milking platform 108. Furthermore, each actuator 118 may be independently adjustable such that the force needed to overcome the impedance provided by each actuator 118 (i.e., the force required to move gates 116 from a default orientation) may be independently adjusted.

At step 218, first sensor 120a is positioned proximate to first actuator 118a (e.g., by coupling first sensor 120a to second end $102a_2$ of first wall 102a at a point adjacent to first actuator 118a). At step 220, second sensor 120b is positioned proximate to second actuator 118b (e.g., by coupling second sensor 120b to second end $102c_2$ of flare wall 102e at a point adjacent to second actuator 118b). At step 222, third sensor 120c is positioned proximate to third actuator 118c (e.g., by coupling third sensor 120c to second end $102c_2$ of flare wall 102c at a point adjacent to third actuator 118c). Sensors 120 may each be independently adjusted (e.g., by adjusting the point at which sensors 120 are mounted relative to actuators 118) such that different threshold amounts of deflection of gates 116 may result in the generation of triggers 122, which may cause controller 126 to stop rotation of rotary milking platform 108. Because both actuators 118 and sensors 120 may be independently adjusted, entrance lane 100 may be configured such that unnecessary stopping of rotary milking platform 108 is minimized.

At step 226, rotary milking platform drive mechanism 138 is coupled to rotary milking platform 108. At step 228, pressure sensor 134 is coupled to rotary milking platform drive mechanism 138 (e.g., by positioning pressure sensor 134 adjacent to exit lane 110). Pressure sensor 134 may be configured such that the threshold amount of pressure causing pressure sensor 134 to generate trigger 136 may correspond to the weight of a human being, which may cause rotary milking platform drive mechanism 138 to stop the supply of a forward rotational force to rotary milking platform 108. At step 230, local reset switch 144 is coupled to rotary milking platform mechanism 138. Local reset switch 144 may be configured to generate reset signal 140, which may cause rotary milking platform drive mechanism 138 to resume providing the supply of forward rotational force to rotary milking platform 108. At step 232, display 142 is coupled to pressure sensor 134. In certain embodiments, display 142 may be coupled to pressure sensor 134 via control 126. Display 142 may be configured to display information about triggers 122a, 122b, 122c, 122d, or any other generated trigger. The installation of entrance lane 100 and pressure sensor 134 is completed at step 224.

Although the steps of method 200 have been described as being performed in a particular order, the present disclosure contemplates that the steps of method 200 may be performed in any suitable order, according to particular needs.

FIG. 3 illustrates an example use scenario for entrance lane 100, according to certain embodiments of the present disclosure. In use, one or more dairy cows may enter entrance lane 100 from a holding pen 104. Because the width of entrance lane 100 at entrance 112 corresponds to the width of a single dairy cow (e.g., thirty inches to thirty-six inches), the dairy cows enter entrance lane 100 one at a time, thereby reducing the likelihood of congestion within entrance lane 100. Additionally, because flare wall 102c is oriented such that the width of entrance lane 100 at exit 114 corresponds to one and a half times to width at entrance 112 (e.g., forty-five to fifty-four inches), the dairy cows may be afforded additional room to line up with one or more stalls 106 of rotary milking platform 108, which may increase the speed and ease with which the dairy cows load into stalls 106. By reducing congestion and increasing speed and ease of loading, entrance lane 100 may increase the efficiency of the milking process, resulting in greater overall milk production.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system, comprising:
   a milking parlor entrance lane comprising:
      an entrance positioned adjacent to a cattle holding pen such that cattle in the cattle holding pen may pass through the milking parlor entrance lane; and
      an exit positioned adjacent to one or more stalls of a rotary milking parlor such that the cattle passing through the milking platform entrance lane may enter the one or more stalls of the rotary milking platform;
   an exit lane positioned on a side of the entrance lane opposite a forward direction of rotation of the rotary milking platform, the milking parlor exit lane positioned adjacent to one or more stalls of a rotary milking platform such that dairy cows may enter the exit lane from the one or more stalls of the rotary milking platform after being milked;
   a pressure sensor positioned adjacent to the exit lane, the pressure sensor operable to:
      generate a trigger in response to detecting a triggering pressure on the pressure sensor; and
      communicate the trigger to initiate stopping of the rotary milking platform.

2. The system of claim 1, further comprising a rotary milking platform drive mechanism operable to supply a forward rotational force to the rotary milking platform.

3. The system of claim 2, wherein the rotary milking platform drive mechanism is further operable to:
   receive the trigger generated by the pressure sensor; and
   initiate the stopping of the rotary milking platform in response to the received trigger.

4. The system of claim 3, wherein initiating the stopping of the rotary milking platform comprises stopping the supply of the forward rotational force to the rotary milking platform.

5. The system of claim 3, wherein the rotary milking platform drive mechanism is further operable to supply a reverse rotational force to the rotary milking platform, the reverse rotational force initiating a reverse rotation of the rotary milking platform, the reverse rotation corresponding to a distance determined by a rotary encoder.

6. The system of claim 3, wherein the rotary milking platform drive mechanism is further operable to:
  receive a reset signal, the reset signal having been generated by a reset sensor in response to an input from a user; and
  initiate starting of the rotation of the rotary milking platform in response to the received reset signal.

7. The system of claim 2 further comprising a controller communicatively coupled to the rotary milking platform drive mechanism, the controller operable to generate a reset signal in response to receiving an input from a user.

8. The system of claim 1, wherein the triggering pressure is adjustable.

9. The system of claim 1, wherein the triggering pressure corresponds to a weight of a human being.

10. The system of claim 1 further comprising a display, the display operable to:
  receive a notification, the notification comprising information about the trigger generated by the pressure sensor; and
  display the notification to a user.

11. The system of claim 1, wherein the pressure sensor is positioned on a floor adjacent to the exit lane.

12. A method, comprising:
  positioning a pressure sensor adjacent to an exit lane, the exit lane positioned on a side of an entrance lane opposite a forward direction of rotation of a rotary milking platform, the exit lane positioned adjacent to one or more stalls of the rotary milking platform such that dairy cows may enter the exit lane from the one or more stalls of the rotary milking platform after being milked, the pressure sensor operable to:
    generate a trigger in response to detecting a triggering pressure on the pressure sensor; and
    communicate the trigger to initiate stopping of a rotary milking platform.

13. The method of claim 12, further comprising communicatively coupling a rotary milking platform drive mechanism to the pressure sensor.

14. The method of claim 13, further comprising coupling the rotary milking platform drive mechanism to the rotary milking platform, the milking platform drive mechanism operable to:
  receive the trigger generated by the pressure sensor; and
  initiate the stopping of the rotary milking platform in response to the received trigger.

15. The method of claim 14, wherein initiating the stopping of the rotary milking platform comprises stopping a supply of a forward rotational force to the rotary milking platform.

16. The method of claim 14, wherein the rotary milking platform drive mechanism is further operable to supply a reverse rotational force to the rotary milking platform, the reverse rotational force initiating a reverse rotation of the rotary milking platform, the reverse rotation corresponding to a distance determined by a rotary encoder.

17. The method of claim 14, wherein the rotary milking platform drive mechanism is further operable to:
  receive a reset signal, the reset signal having been generated by a reset sensor in response to an input from a user; and
  initiate starting of the rotation of the rotary milking platform in response to the received reset signal.

18. The method of claim 13 further comprising communicatively coupling a controller to the rotary milking platform drive mechanism, the controller operable to generate a reset signal in response to receiving an input from a user.

19. The method of claim 12, wherein the triggering pressure is adjustable.

20. The method of claim 12, wherein the triggering pressure corresponds to a weight of a human being.

21. The method of claim 12 further comprising communicatively coupling a display to the pressure sensor, the display operable to:
  display a notification to a user, the notification comprising information about the trigger generated by the pressure sensor.

22. The method of claim 12, wherein positioning a pressure sensor adjacent to the exit lane comprises positioning the pressure sensor on a floor adjacent to the exit lane.

23. A system, comprising:
  a milking parlor entrance lane comprising:
    an entrance positioned adjacent to a cattle holding pen such that cattle in the cattle holding pen may pass through the milking parlor entrance lane; and
    an exit positioned adjacent to one or more stalls of a rotary milking platform such that the cattle passing through the milking parlor entrance lane may enter the one or more stalls of the rotary milking platform;
  an exit lane positioned on a side of the entrance lane opposite a forward direction of rotation of the rotary milking platform, the milking parlor exit lane positioned adjacent to one or more stalls of a rotary milking platform such that dairy cows may enter the exit lane from the one or more stalls of the rotary milking platform after being milked;
  a pressure sensor positioned on a floor adjacent to the exit lane, the pressure sensor operable to:
    generate a trigger in response to detecting a triggering pressure on the pressure sensor, wherein the triggering pressure is adjustable; and
    communicate the trigger to initiate stopping of the rotary milking platform;
  a rotary milking platform drive mechanism communicatively coupled to the pressure sensor, the rotary milking platform drive mechanism operable to:
    supply a forward rotational force to the platform;
    receive the trigger generated by the pressure sensor; and
    initiate the stopping of the rotary milking platform in response to the received trigger, wherein initiating the stopping of the rotary milking platform comprises stopping the supply of the forward rotational force to the rotary milking platform; and
    initiate starting of the rotation of the rotary milking platform in response to receiving a reset signal, the reset signal having been generated by a reset sensor in response to an input from a user;
  a display, the display operable to:
    receive a notification, the notification comprising information about the trigger generated by the pressure sensor; and
    display the notification to a user.

24. The system of claim 23 further comprising a controller communicatively coupled to the rotary milking platform drive mechanism, the controller operable to generate a reset signal in response to an input from the user.

25. The system of claim 23, wherein the triggering pressure is adjustable.

26. The system of claim 23, wherein the triggering pressure correspond to a weight of a human being.

27. The system of claim 23, wherein the rotary milking platform drive mechanism is further operable to supply a reverse rotational force to the rotary milking platform, the reverse rotational force initiating a reverse rotation of the rotary milking platform, the reverse rotation corresponding to a distance determined by a rotary encoder.

* * * * *